United States Patent
Mueller et al.

(10) Patent No.: US 7,750,587 B2
(45) Date of Patent: Jul. 6, 2010

(54) METHOD OF CONTROLLING A MOTOR OF A BATTERY-OPERATED POWER TOOL

(75) Inventors: Thomas Mueller, Lecsteld (DE);
Germar Meiendres, Landsberg (DE);
Konstantin Baxivanelis, Kaufering (DE); Johannes Stempfhuber, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 292 days.

(21) Appl. No.: 11/897,284

(22) Filed: Aug. 29, 2007

(65) Prior Publication Data
US 2008/0106225 A1 May 8, 2008

(30) Foreign Application Priority Data
Sep. 4, 2006 (DE) .................. 10 2006 000 439

(51) Int. Cl.
*H02P 1/04* (2006.01)
(52) U.S. Cl. ..................................... 318/461; 388/937
(58) Field of Classification Search ................. 318/461, 318/432, 434, 798, 800; 388/937, 800, 806, 388/815, 821
See application file for complete search history.

(56) References Cited

U.S. PATENT DOCUMENTS

| | | | | |
|---|---|---|---|---|
| 5,014,793 | A * | 5/1991 | Germanton et al. | 173/181 |
| 6,191,560 | B1 * | 2/2001 | Sakakibara | 320/150 |
| 6,324,339 | B1 * | 11/2001 | Hudson et al. | 388/809 |
| 6,696,814 | B2 * | 2/2004 | Henderson et al. | 318/811 |
| 2004/0179829 | A1 * | 9/2004 | Phillips et al. | 388/804 |
| 2006/0222930 | A1 * | 10/2006 | Aradachi et al. | 429/96 |
| 2007/0019933 | A1 * | 1/2007 | Phillips et al. | 388/804 |

* cited by examiner

*Primary Examiner*—Rina I Duda
(74) *Attorney, Agent, or Firm*—Abelman, Frayne & Schwab

(57) ABSTRACT

The method of controlling a motor which drives a tool of a power tool, includes initializing an electronic device and switching the motor on in a first step (31), continuously monitoring of the motor current (IM) and a battery voltage (UB) in a second step (32) which alternates with a third step (33) in which a continuous comparison of the battery voltage (UB) to a threshold value (GW) stored in a memory of the electronic device is carried out.

4 Claims, 5 Drawing Sheets

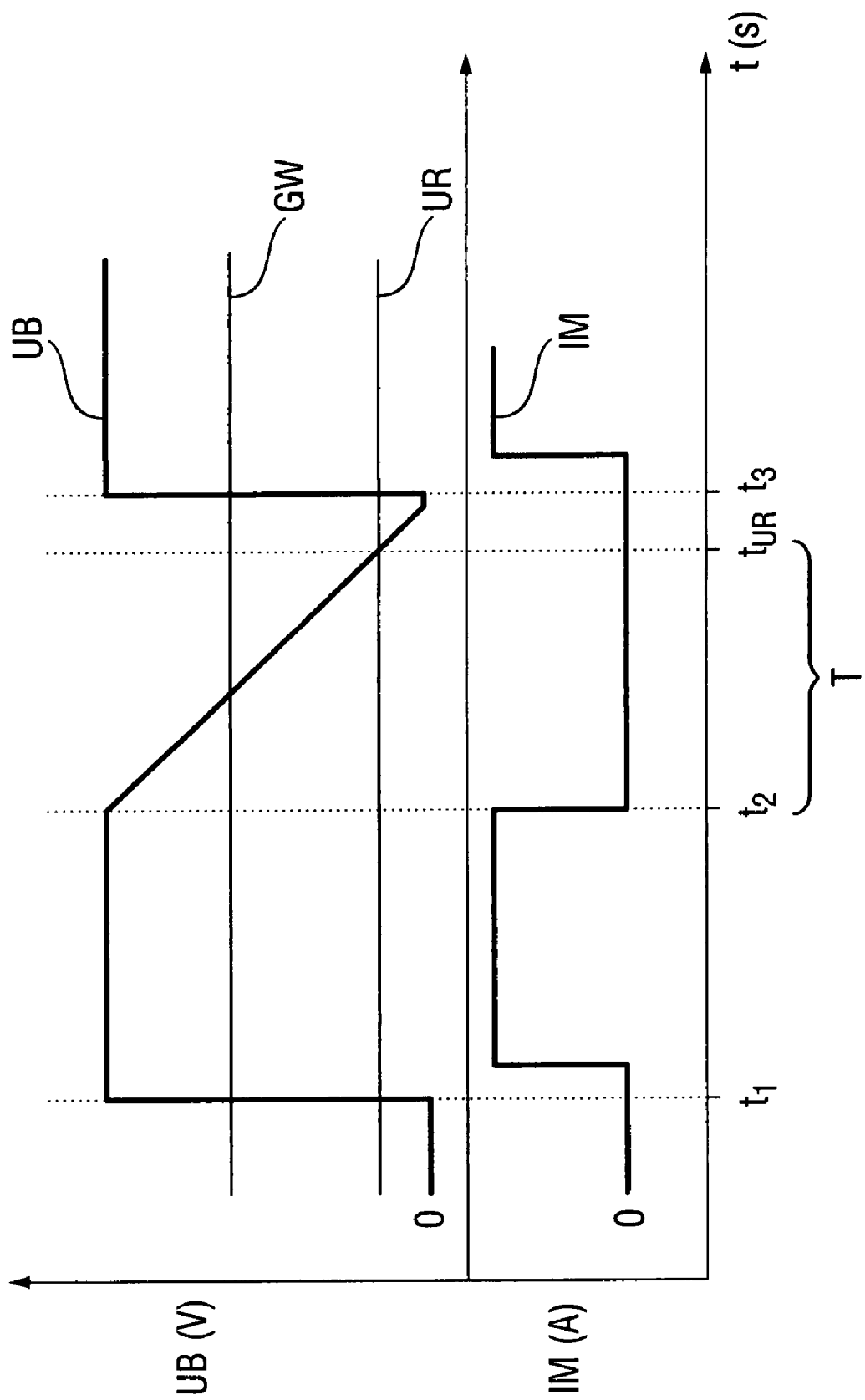

METHOD OF CONTROLLING A MOTOR OF A BATTERY-OPERATED POWER TOOL

BACKGROUND OF THE INVENTION

1. Field of the Invention

The invention relates to a method of controlling a motor of a battery-operated power tool, such as a hand-held circular saw and to a control device for carrying out the method.

2. Description of the Prior Art

A motor drives a power tool in an "on" position of a motor switch that is actuated manually by the user. In battery-operated devices, as a rule, the electronics in their entirety are also disconnected from the battery by the motor switch in order to prevent a discharge of the battery when not in use. Further, in order to prevent damage to the motor or electric components, the process for controlling the motor of the power tool is generally designed in such a way that the control electronic switch off the power tool and motor when a certain supply voltage is not available. The undervoltage lockout is carried out, for example, when the battery is discharged or is defective.

An undervoltage lockout of the type mentioned above is known, e.g., from DE 36 11 884 A1 in a battery-operated hand tool. A lockout relay controlled by a flip-flop circuit is provided for carrying out the control process, the flip-flop circuit being controllable by an undervoltage monitor. The cutoff relay can be connected to voltage by means of a main switch to start operation of the power tool. The cutoff relay has a switch that short-circuits the motor in case of failure of the cutoff relay so that the motor is braked when the main switch is released again or when the undervoltage monitor causes an undervoltage lockout by means of the flip-flop circuit.

It is disadvantageous that it is impossible to distinguish a cutoff caused by actuation of the motor switch from a cutoff caused by inadequate power supply, e.g., when the battery is discharged or defective. Further, it is not possible to switch the power tool back on immediately after the switch has been turned off when the control electronics have a microcontroller, as is commonly the case in modern power tools, because, while the voltage has fallen below the threshold for undervoltage lockout, the voltage has not yet fallen below the threshold for reinitializing the control electronics and the microcontroller. This is the case particularly when the undervoltage lockout responds very quickly, i.e., has only a short time window before reacting (cutoff). Depending on the design and construction of the electronics, the time window can last up to several seconds before it is possible to turn the power tool back on again by means of the motor switch, which is annoying for the user. Different control options are not possible.

It is the object of the present invention to provide a control method process which avoids the above-mentioned disadvantages.

SUMMARY OF THE INVENTION

This and other objects of the present invention, which will become apparent hereinafter, are achieved, according to the invention, in that a continuous monitoring of the motor current and battery voltage is carried out in a second step following an initialization of the electronic device and control electronics, and in that a continuous comparison of the battery voltage to a threshold value stored in a memory of the electronic device is carried out in a third step which alternates with the second step. This offers the advantage that a switch actuation can be distinguished from a lockout due to a discharged or defective battery without directly monitoring the motor switch and accordingly different control steps are possible for a cutoff caused by insufficient supply voltage and for a cutoff due to switch actuation.

Accordingly, a further process step can advantageously be provided in case the "off" position of a motor switch is detected by the electronic device, wherein a continuous monitoring of the battery voltage is carried out for a defined period of time in this further step of the process. In this connection, it is advantageous that the motor can be switched on without a delay in time when the motor switch is actuated again because the electronic device need not be initialized first. Accordingly, it is possible to restart the motor of the power tool after the motor switch has been switched off by immediately switching it on again.

The threshold value for the battery voltage is advantageously in a range from 5 V to 70% of the rated voltage of the usable battery, which ensures a reliable control of the power semiconductor or power switch, e.g., a MOSFET. When the battery used in a power tool has a rated voltage of 24 V, the threshold value is between 5 V and 16.8 V.

In addition, the above-stated object is met by a power tool with a control device for carrying out the process in one of the arrangements mentioned above. The second, third and additional step of the process are advantageously carried out in a microcontroller associated with the electronic device.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 5 an example of a waveform of the motor current and battery voltage during a cutoff of the power tool without restarting of the motor, using the control process according to the invention.

DETAILED DESCRIPTION OF THE PREFERRED EMBODIMENT

Figure 1:
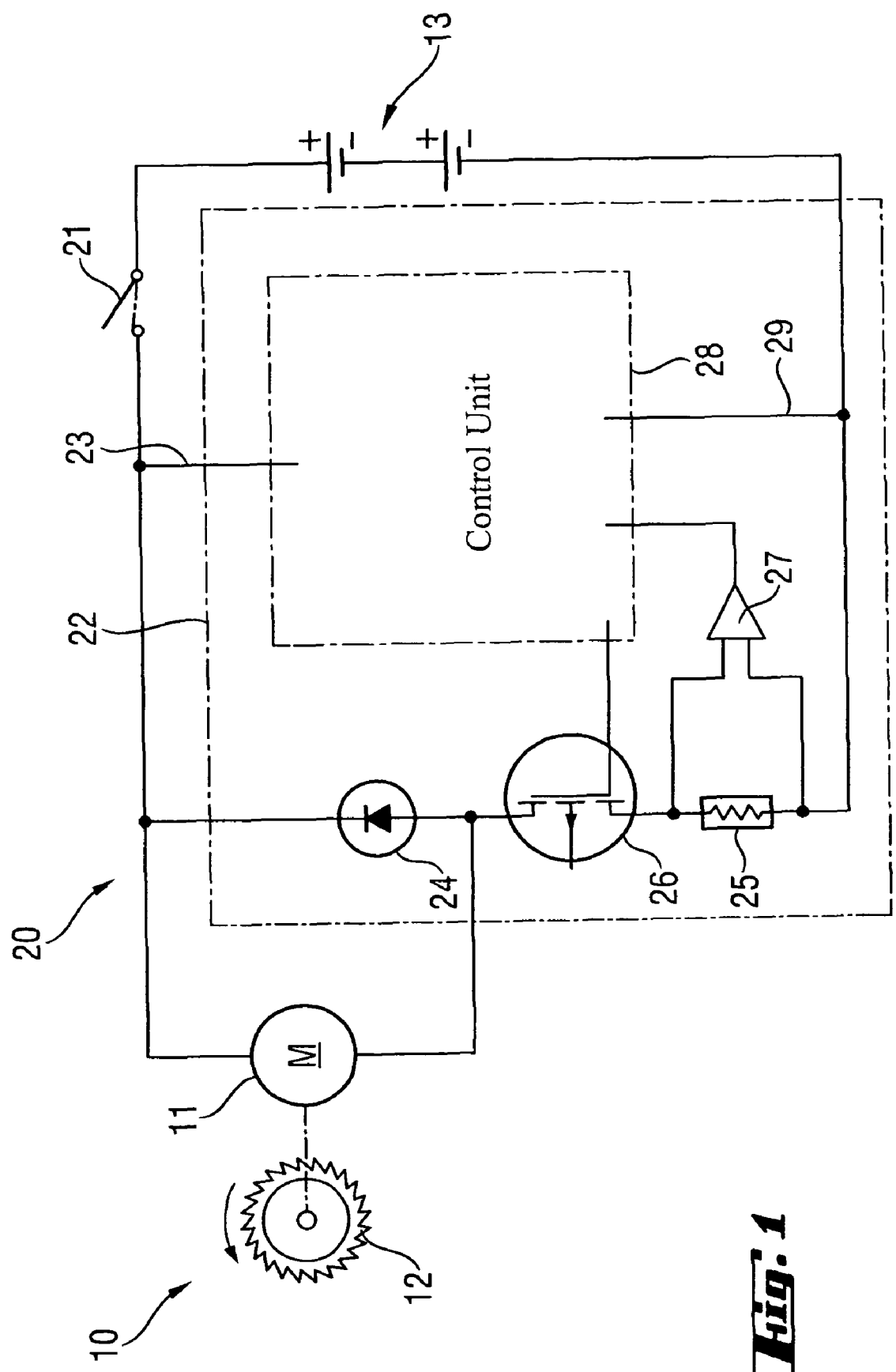
FIG. 1 a schematic view of a control device of a power tool for carrying out a control process according to the present invention for a motor provided for driving a tool.

FIG. 1 shows the control device 20 of a power tool 10, not shown in detail, in the form of a hand-held circular saw with a motor 11 by which a disk-shaped tool 12 in the form of a saw blade can be driven at a nominal power. The motor 11 can be switched on and off by means of a motor switch 21 of the control device 20. For this purpose, the motor switch 21 is displaceable between an "off" position shown in the drawing and an "on" position shown in dash-dot lines. In the "on"

position, a battery voltage generated by a battery 13 is applied to the motor 11 and the control device 20.

The control device 20 has an electronic device 22 which comprises a protection diode 24, a shunt in the form of a low-ohm resistor 25, an electronic power switch 26, an operation amplifier 27, and a control unit 28. The control unit 28 also has a microcontroller which is not shown in the drawing.

A motor current IM (see FIGS. 2 to 5) occurring when the motor 11 is operated is permanently determined by the resistor 25 and the operation amplifier 27 of the electronic device 22 and is evaluated by the control unit 28 with the microcontroller. The battery voltage UB (see FIGS. 2 to 5) is determined along path 23 and is evaluated by the control unit 28 with the microcontroller. The control unit 28 is connected to ground via line 29.

Figure 2:
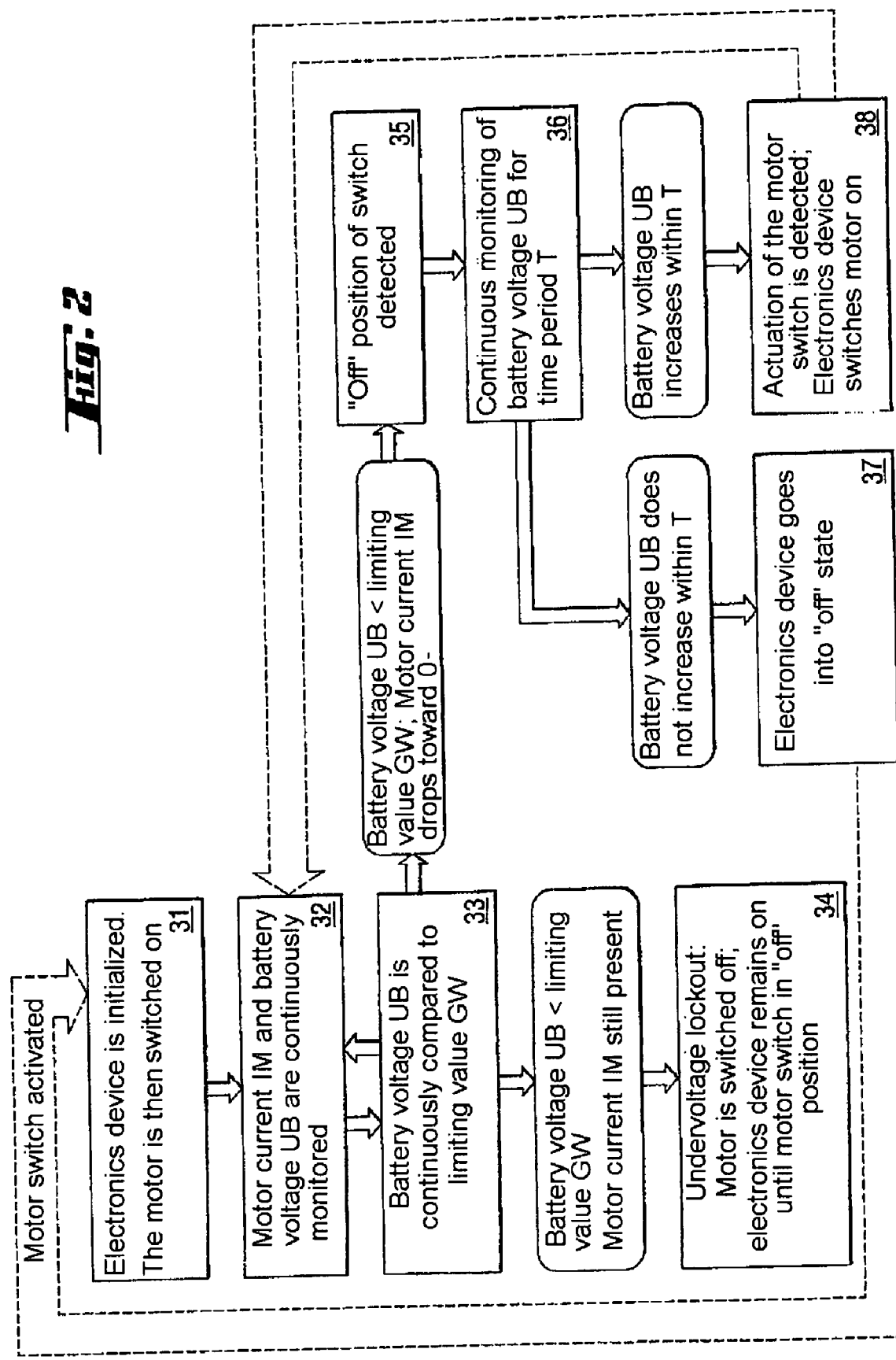
FIG. 2 a flowchart of a control process according to the invention.

The control process according to the invention is represented in the flowchart in FIG. 2. When the motor switch 21 is activated in a first step 31, the control unit 28 with the microprocessor is first initialized and the motor 11 is then switched on. Monitoring of the motor current IM and battery voltage UB is then carried out in a continuously repeated second step 32. In a third step 33 which is likewise continuously repeated, the battery voltage UB is compared to a threshold value GW stored in a memory of the control unit 28. The threshold value GW lies in a range from 5 V to 70% of the nominal voltage of the usable battery. If the battery voltage UB falls below the threshold value GW and the motor current IM does not decrease towards zero, the control device 28 detects that the motor switch 21 has not been moved into an "off" position (solid line in FIG. 1) but rather that the battery 13 is defective or discharged. Then, in a fourth step 34, the control device 28 executes an undervoltage lockout of the motor 11, and the electronic device 22 remains switched on until the motor switch 11 is moved manually into the "off" position. The cutoff is carried out, e.g., by means of the electronic power switch 26 which is constructed, e.g., as a MOSFET.

When it is determined during the second and third steps 32, 33, which are carried out continuously, that the battery voltage UB decreases below the threshold value GW and the motor current IM decreases toward zero, it is then detected by the control device 28 in a fifth step 35 that the motor switch 21 has been moved into an "off" position (solid line in FIG. 1). The battery voltage UB is then monitored in a sixth step 36 for a time period T, e.g., 2 to 5 seconds. If the battery voltage UB does not increase again within time period T due to a new actuation of the motor switch 21, the electronic device 22 is then moved into an "off" state in a seventh step 37. When actuated again, the electronic device 22 is first initialized again in a first step 31 and the motor 11 is then switched on.

If the battery voltage UB increases again within the time period T, a new actuation of the motor switch 21 is detected and the motor 11 is switched on again by the electronic device 22 in an eighth step 38. The control process then jumps directly to the second step 32 and to the third step 33 of continuously monitoring the battery voltage UB and motor current IM and continuously comparing the battery voltage UB to the threshold value GW.

The power supply of the control device 28 during time period T can be carried out, e.g., by capacitors that are present in the control device 28 or by the motor 11 which is still rotating and which supplies the control unit 28 with sufficient power to operate the microcontroller through the voltage induced by the rotation. The duration of time period T is preferably defined by the time during which there is still current available for supplying the control unit, but can also be defined by the microcontroller.

The control process according to the invention will be explained more fully referring to FIGS. 3 to 5 which show the current and voltage waveforms for different operating situations. The measured battery voltage UB in volts (V) and the measured motor current IM in amperes (A) are plotted on the ordinate of the graphs. The time t in seconds is plotted on the abscissa.

Figure 3:
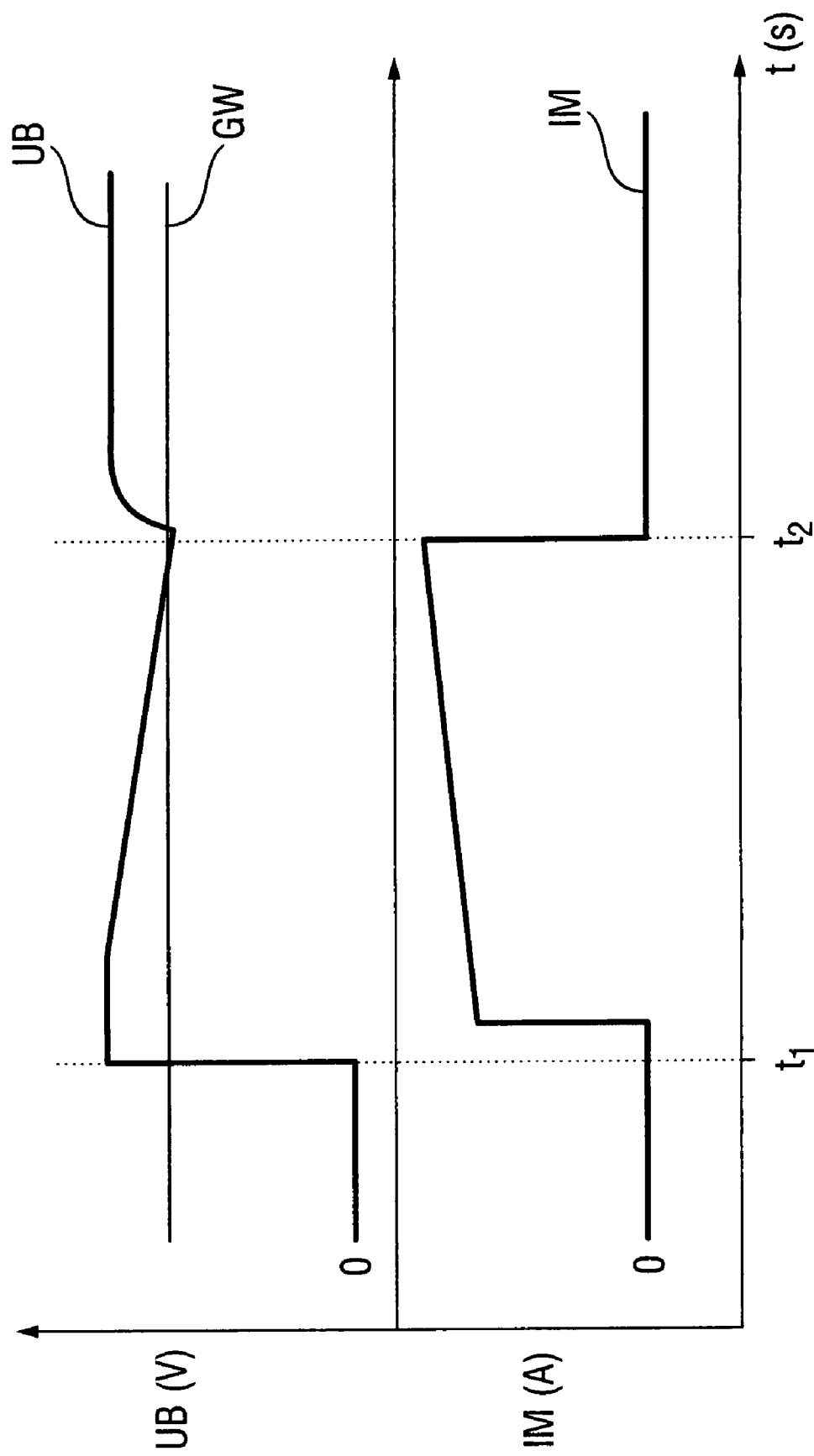
FIG. 3 an example of a waveform of a motor current and a battery voltage during an undervoltage lockout of the power tool, using the control process according to the invention.

FIG. 3 shows the waveform of the motor current IM and battery voltage UB when the battery is discharged or defective. At a first time $t_1$, the user actuates the motor switch 21 and moves it to the "on" position (shown in dashed lines in FIG. 1). The battery voltage UB increases immediately, while the motor current IM increases after a time delay because the electronic device 22 must first be initialized in the first step 31 of the control process. The second and third steps 32 and 33 of the control process, the continuous monitoring of the battery voltage UB and the motor current IM and the continuous comparison of the battery voltage UB to the threshold value GW, start at time $t_1$. At the second time $t_2$, the battery voltage UB has dropped below the threshold value GW, while the motor current IM is still present at this second time $t_2$. The control unit 28 detects a discharge or a defect in the battery 13 and in a fourth step 34 initiates the undervoltage lockout during which the motor 11 is turned off. However, the electronic device 22 remains switched on until the motor switch 11 is changed manually to the "off" position. After the motor 11 is turned off, the battery voltage UB increases again above the threshold value GW.

Figure 4:
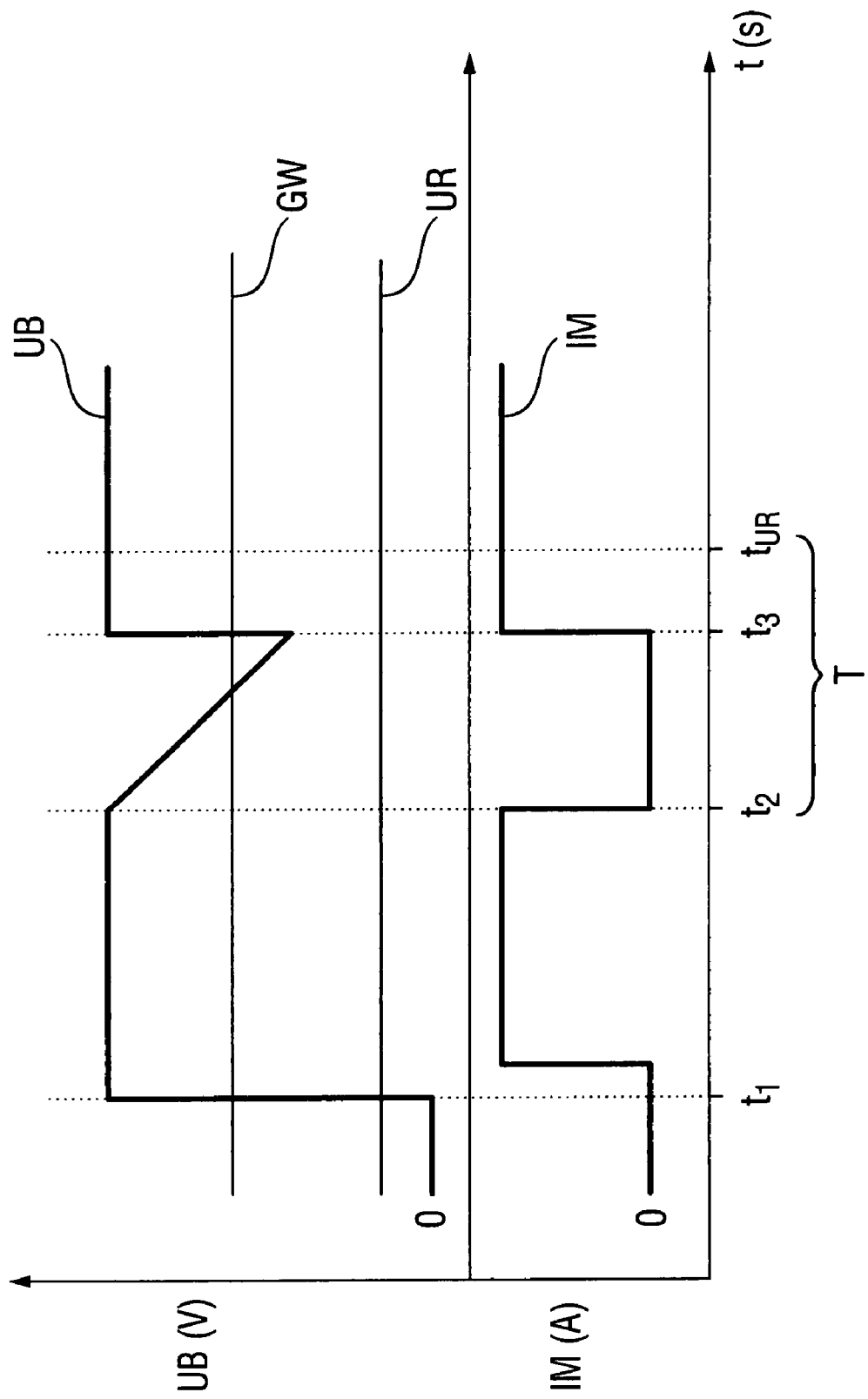
FIG. 4 an example of a waveform of the motor current and battery voltage during a cutoff of the power tool with restarting of the motor, using the control process according to the invention.

FIG. 4 shows the waveform of the motor current IM and the battery voltage UB for the case in which the power tool 10 is switched off by means of the motor switch 21 and is switched on again within time period T. At the first time $t_1$, the user actuates the motor switch 21 and moves it into the "on" position (shown in dashes in FIG. 1), and steps 31, 32 and 33 of the control process take place as described above. At the second time $t_2$, the motor switch 21 is moved to the "off" position (see FIG. 1) by the user. The battery voltage UB decreases gradually, while the motor current IM returns almost directly to zero. In a fifth step 35, the control unit 28 detects that the motor switch 21 has been moved to the "off" position and, in a sixth step 36, continuously monitors the battery voltage UB during time period T. At the third time $t_3$, the battery voltage UB increases again sharply within time period T. In an eighth step 38, the motor 11 is switched on again by the electronic device 22. As was already described, the control process then skips directly to the second step 32 and third step 33, the continuous monitoring of the battery voltage UB and the motor current IM and the continuous comparison of the battery voltage UB to the threshold value GW.

The waveforms of the motor current IM and battery voltage UB shown in FIG. 5 differ from those shown in FIG. 4 only in that the power tool 10 is not switched on again within time period T, but rather only after the expiration of this time period T. After the motor switch 21 is moved into the "off" position at the second time $t_2$, the battery voltage UB drops continuously toward zero. At time $t_{UR}$, the battery voltage UB falls below the threshold value UR. This time $t_{UR}$ defines the end of time period T. Accordingly, at time $t_{UR}$, the seventh step 37 of the control process takes place. The electronic device 22 goes into an "off" state so that a new initialization of the electronic device 22 is necessary before the motor 11 is started. At the third time $t_3$, the motor switch 21 is actuated again and moved into the "on" position. The battery voltage UB immediately increases, while the motor current IM increases after a time delay because the electronic device 22 must first be initialized in the first step 31 of the control process. The second and third steps 32 and 33 of the control process take place, the continuous monitoring of the battery voltage UB and motor current IM and the continuous comparison of the battery voltage UB to the threshold value GW, takes place at the third time $t_3$.

Instead of defining the end of the time period T or its duration by the threshold value UR, the time period T could also be stored in the memory of the microcontroller or control unit 28 and the electronic device 22 is put into the "off" state in the seventh step 37 by the microcontroller.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A method of controlling a motor (11) for driving a working tool (12) of a battery-operated power tool (10) in an "on" position of a motor switch (21), comprising a first step (31) in which an electronic device (22) of a control device (20) is initialized and the motor (11) is switched on; a second step (32) in which a motor current (IM) and a battery voltage (UB) are continuously monitored; a third step (33) in which the battery voltage (UB) is continuously compared to a threshold value (GW) stored in a memory of the electronic device (22), with the third step (33) and the second step (32) alternating with each other; and a further step (36) in which the battery voltage (UB) is continuously monitored for a predetermined time period (T) following a detection of an "off" position of the motor switch (21) by the electronic device (22).

2. A method according to claim 1, wherein the threshold value (GW) lies in a range from 5 V to 70% of the rated voltage of the usable battery (13).

3. A method according to claim 1, further comprising the step of moving the central device (22) into an "off" state if the battery voltage (UB) does not increase within the predetermined time period (T).

4. A control device (20) for controlling a motor (11) for driving a working tool (12) of a battery-operated power tool (10), comprising a motor switch (21) for switching the motor (11) "on" and "off," a control unit (28) for monitoring a motor current (IM) and a battery voltage (UB); means (25, 26) for communicating the motor current (IM) to the control unit (28); means (23) for communicating the battery voltage (UB) to the control unit (28); and means (26) connected with the control unit (28) and the motor (11) for effecting undervoltage lockout of the motor (11) when the battery voltage (UB) decreases below a predetermined threshold value (GW).

* * * * *